US008478042B2

(12) United States Patent
Narasimha

(10) Patent No.: US 8,478,042 B2
(45) Date of Patent: Jul. 2, 2013

(54) METHOD AND APPARATUS FOR ENHANCING IMAGE OR VIDEO QUALITY USING AN EXPOSURE AWARE SCENE ADAPTIVE GLOBAL BRIGHTNESS CONTRAST

(75) Inventor: Rajesh Narasimha, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 499 days.

(21) Appl. No.: 12/835,808

(22) Filed: Jul. 14, 2010

(65) Prior Publication Data

US 2011/0096989 A1    Apr. 28, 2011

Related U.S. Application Data

(60) Provisional application No. 61/254,893, filed on Oct. 26, 2009.

(51) Int. Cl.
*G06K 9/00* (2006.01)
*H04N 5/235* (2006.01)
*H04N 5/08* (2006.01)

(52) U.S. Cl.
USPC ......... 382/168; 382/274; 348/221.1; 348/528

(58) Field of Classification Search
USPC .................. 382/168, 169, 274; 348/687, 678, 348/597, 528, 536, 603, 221.1, 229.1, 362, 348/254
See application file for complete search history.

(56) References Cited

U.S. PATENT DOCUMENTS

| 7,081,906 B2 * | 7/2006 | Kim et al. ..................... 345/690 |
| 7,088,388 B2 * | 8/2006 | MacLean et al. ............. 348/234 |
| 7,605,872 B2 * | 10/2009 | Chen ............................. 348/678 |
| 7,839,455 B2 * | 11/2010 | Harada ......................... 348/672 |
| 8,155,434 B2 * | 4/2012 | Kerofsky et al. ............. 382/162 |

OTHER PUBLICATIONS

Reinhard, et al., "Photographic Tone Reproduction for Digital Images", ACM Transactions on Graphics, 21(3), Jul. 2002 (Proceedings of SIGGRAPH 2002).

* cited by examiner

*Primary Examiner* — Shefali Goradia
(74) *Attorney, Agent, or Firm* — Mirna Abyad; W. James Brady; Frederick J. Telecky, Jr.

(57) ABSTRACT

A method and apparatus for enhancing at least one of video and image quality using an exposure aware scene adaptive global brightness contrast. The method includes determining if gain control is needed utilizing Gamma corrected histogram and ancillary data, if gain control is not required, computing a set of scene adaptive tone points and blending with information from histogram equalization if needed, if gain control is required, estimating gain value and utilizing the gain value in computing the gain table, and accordingly, generating a look-up table for enhancing global brightness contrast utilizing the gain table, the tone table and the information from histogram equalization.

9 Claims, 6 Drawing Sheets

Lab testing – In high dynamic scenes, brightens the shadows and preserves the highlights Field testing – In high dynamic scenes, brightens the shadows and preserves the highlights Lab testing – In normal scenes, contrast is enhanced

METHOD AND APPARATUS FOR ENHANCING IMAGE OR VIDEO QUALITY USING AN EXPOSURE AWARE SCENE ADAPTIVE GLOBAL BRIGHTNESS CONTRAST

CROSS-REFERENCE TO RELATED APPLICATIONS

This application claims benefit of U.S. provisional patent application Ser. No. 61/254,893 filed Oct. 26, 2009, which is herein incorporated by reference.

BACKGROUND OF THE INVENTION

1. Field of the Invention

Embodiments of the present invention generally relate to a method and apparatus for enhancing image or video quality using an exposure aware scene adaptive global brightness contrast.

2. Description of the Related Art

Global Brightness Contrast Enhancement (GBCE) is an important component in a digital camera that improves brightness and contrast of the image/video using adaptive tone mapping under various scene conditions. GBCE has become important in recent times due to the introduction of wide dynamic range sensors where the images are captured with the large dynamic range and a need exists to preserve the content in the both bright and dark regions. Rendering the optimal brightness and contrast improves overall image/video quality.

This is a challenging task since most often GBCE is adjusted based on the histogram alone. The global brightness enhancement (GBE) component increases the brightness by applying a gain to the histogram and the global contrast enhancement (GCE) component enhances the contrast by stretching the histogram and filling in the empty spaces in the histogram.

FIG. 1 is an embodiment of a tone mapping based on input histogram. This phenomenon is shown in FIG. 1, where a tone curve is shown based on a input histogram. As seen in FIG. 1, the curve has a positive slope (expansion) where the histogram bins are occupied and depicts a negative slope (compression) where the histogram bins are empty. The vertical lines show the shadow, mid tone and highlight regions.

Traditionally, the histogram does not fully represent the image content information and the image quality can be improved optimally if brightness and contrast can be adjusted based on image content information. A similar content of the image (e.g., sky, foliage, face) can be in shadow, mid tone or highlight regions, and the image needs to be tuned differently based on the scene condition. Some of the common problems that most existing GBCE algorithms encounter are that noise is amplified in dark/low light images, color gets de-saturated, mid-tones do not remain intact, highlight regions (e.g. bright light, snow regions) are over saturated, and the GBCE algorithm does not generalize well on a large image set.

Furthermore, sometimes the auto-exposure (AE) system can underexpose or overexpose the image due to poor metering and hence brightness of the image needs to be adjusted by the GBCE system and the information can be fed back to the AE system. Histogram Equalization (HE) is known to be one of the simplest techniques to improve brightness and contrast; however, most often the image looks washed out since it equalizes the histogram to a uniform distribution which is not optimal.

Since GBCE is the most important visual rendering component of the image besides color, this has to be adjusted optimally which means that the histogram needs to be controlled in an optimal manner such that all the content of the image is preserved. Therefore, there is a need for an improved method and/or apparatus for enhancing an exposure aware scene adaptive global brightness contrast.

SUMMARY OF THE INVENTION

Embodiments of the present invention relate to a method and apparatus for enhancing at least one of video and image quality using an exposure aware scene adaptive global brightness contrast. The method includes determining if gain control is needed utilizing Gamma corrected histogram and ancillary data for auto exposure failures, if gain control is not required, computing a set of scene adaptive tone points and blending with information from histogram equalization if needed, if gain control is required, estimating gain value and utilizing the gain value in computing the gain table, and accordingly, generating a look-up table for enhancing global brightness contrast utilizing the gain table, the tone table and the information from histogram equalization.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION

Figure 1:
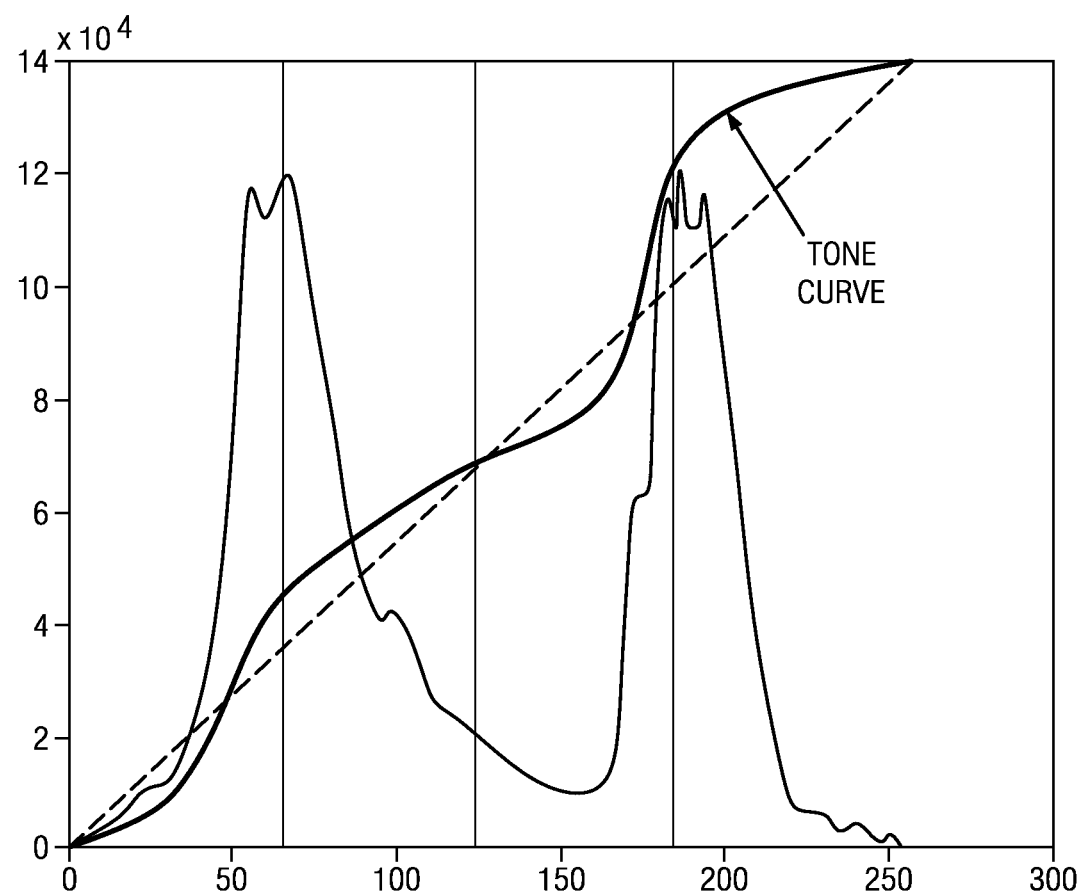
FIG. 1 is an embodiment of a tone mapping based on input histogram.
Figure 2:
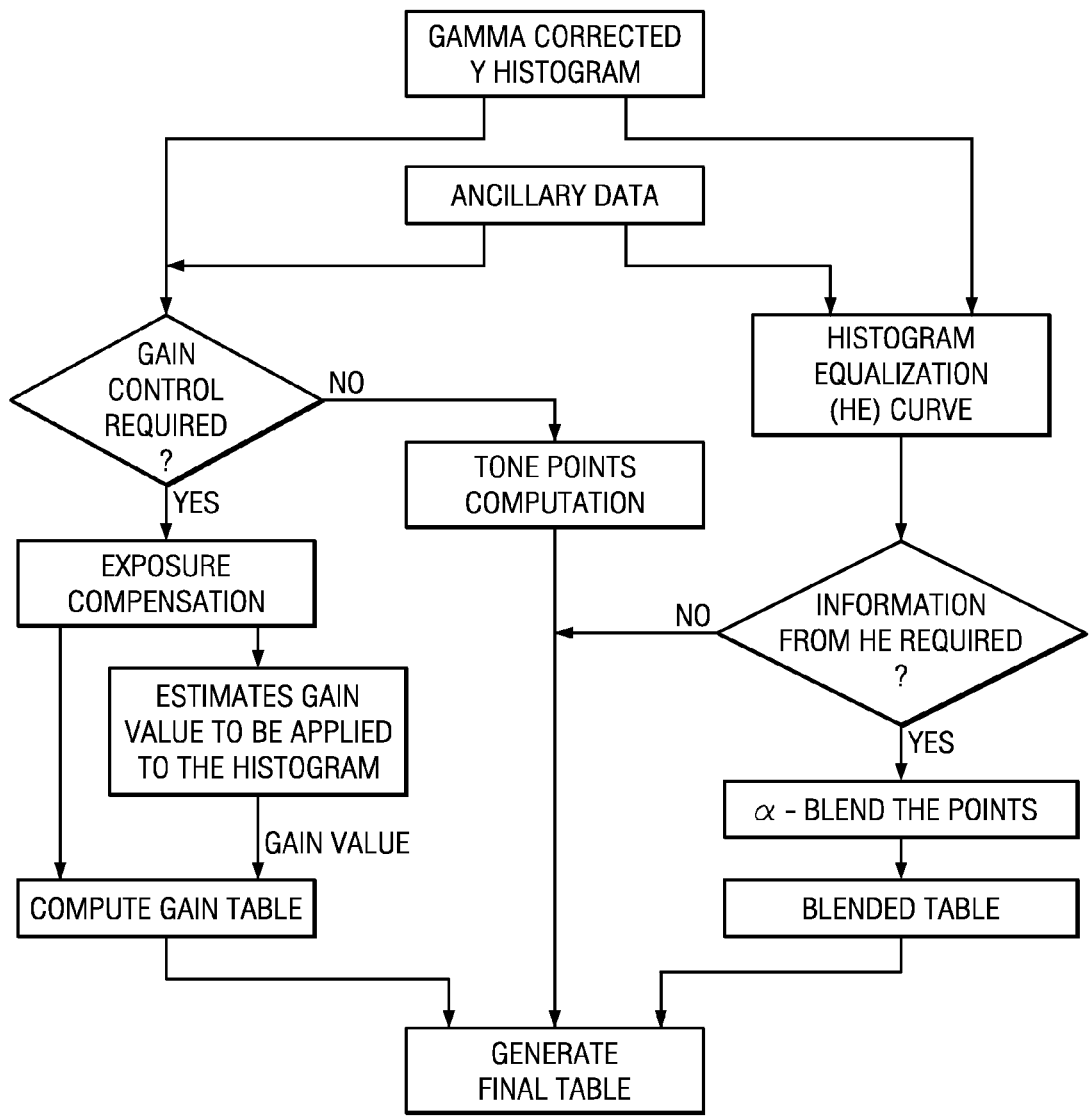
FIG. 2 is a flow diagram depicting an embodiment of a method for enhancing video/image quality using an exposure aware scene adaptive global brightness contrast.

FIG. 2 is a flow diagram depicting an embodiment of a method for enhancing video/image quality using an exposure aware scene adaptive global brightness contrast. As shown in FIG. 2, the inputs to the Exposure Aware Scene Adaptive Global Brightness Contrast Enhancement Algorithm are the luminance histogram and ancillary data such as exposure time and analog gain. Using these inputs the algorithm determines the scene and estimates the gain that needs to be applied in order to compensate for AE failures. This is the gain table computation as shown in FIG. 2. If the exposure is sufficient, then the tone points are computed optimized to the scene variations. This is one of the advantages of the proposed approach.

Figure 3:
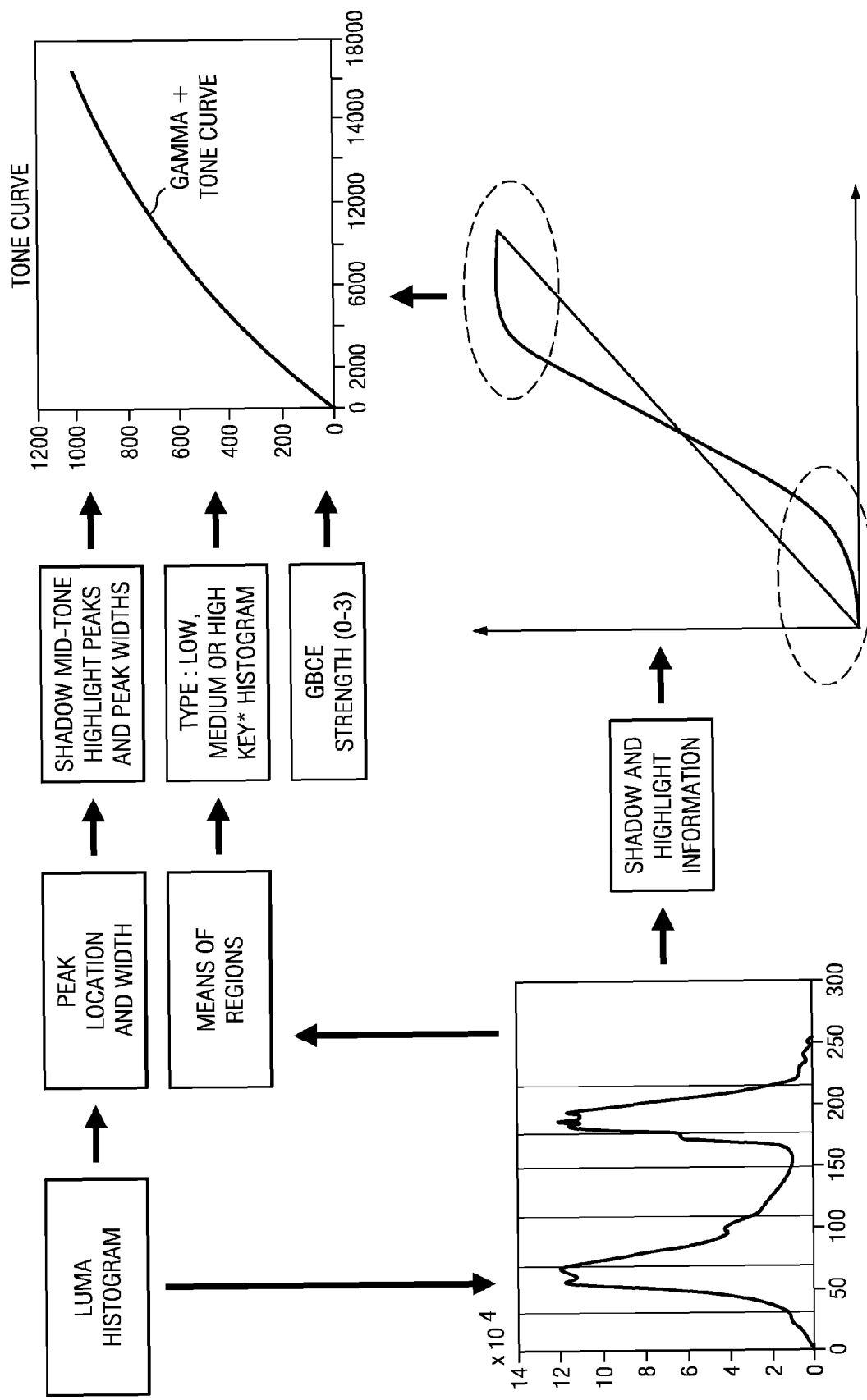
FIG. 3 is a flow diagram depicting an embodiment of a method for determining mapping for an adaptive tone.

The scene adaptive tone points computation is shown in FIG. 3. FIG. 3 is a flow diagram depicting an embodiment of a method for determining mapping for an adaptive tone. The peak width, location and means of the shadow, mid tone and highlight regions are calculated from the histogram for each scene. In addition, the number of the shadow of highlight pixels is estimated. The histogram key is determined which is test for whether the histogram is subjectively light, normal, or dark. For example, a white-painted room would be high-key, and a dark room would be low-key. Based on the strength parameter which is set between (0-3), where 3 represents the strongest contrast, the scene adaptive tone points are obtained and then the tone curve is generated based on these tone points. Tone curve is then combined with the gamma curve to obtain the final GBCE curve.

Figure 4:
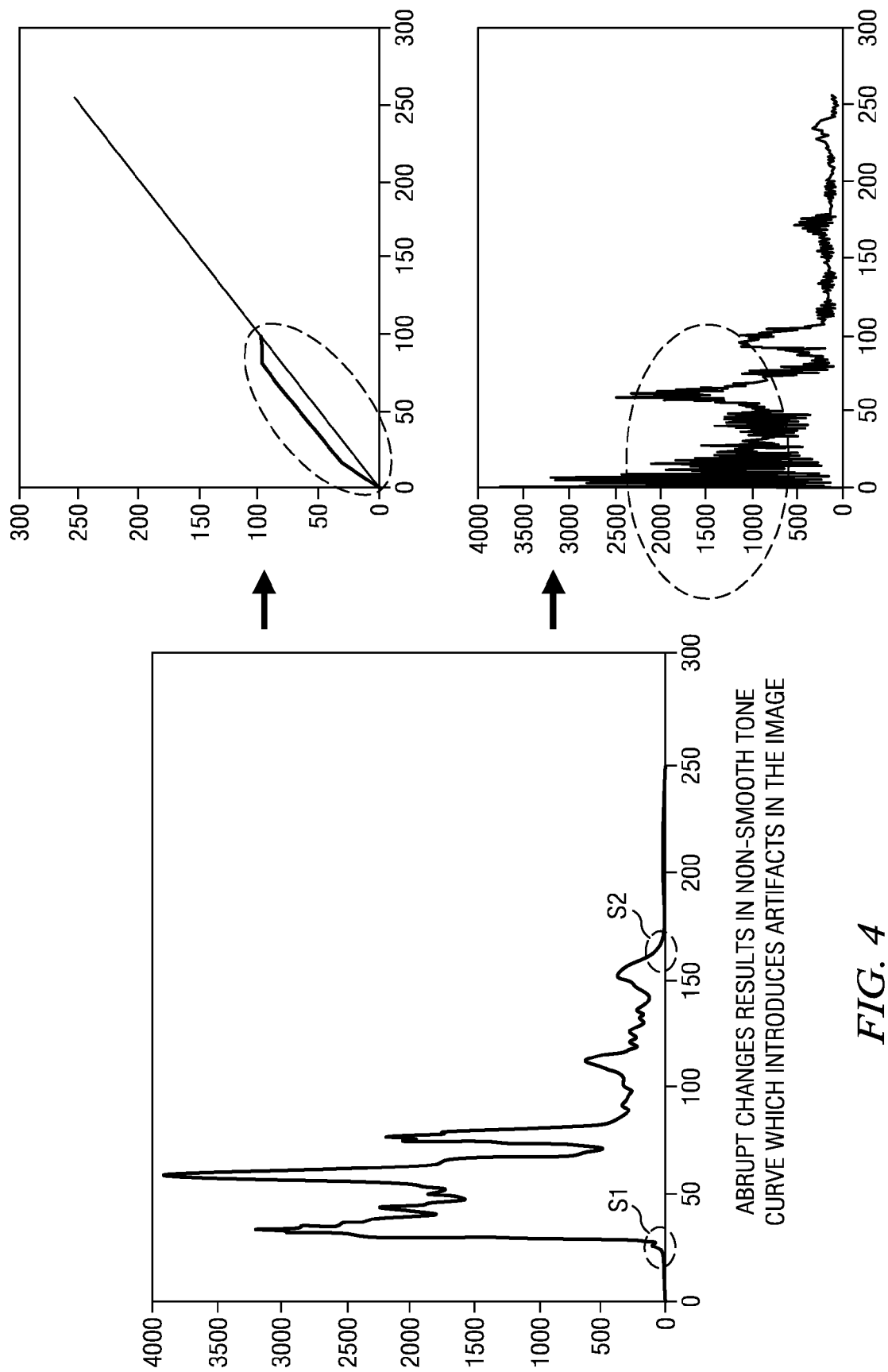
FIG. 4 is an embodiment of a demonstration of abrupt changes to the tone curve resulting in artifacts in the image.

FIG. 4 is an embodiment of a demonstration of abrupt changes to the tone curve resulting in artifacts in the image. The tone curve generated by the proposed algorithm is smooth and avoids unnecessary artifacts that are generated due to abrupt changes to the tone curve as shown in FIG. 4. This is the other advantage of the proposed method. This method also uses information from Histogram Equalization (HE) Curve which can be blended with the scene adaptive tone points if needed to generate the final table. This provides a valuable handle to optimally set the brightness and contrast based on scene conditions.

Figure 5:
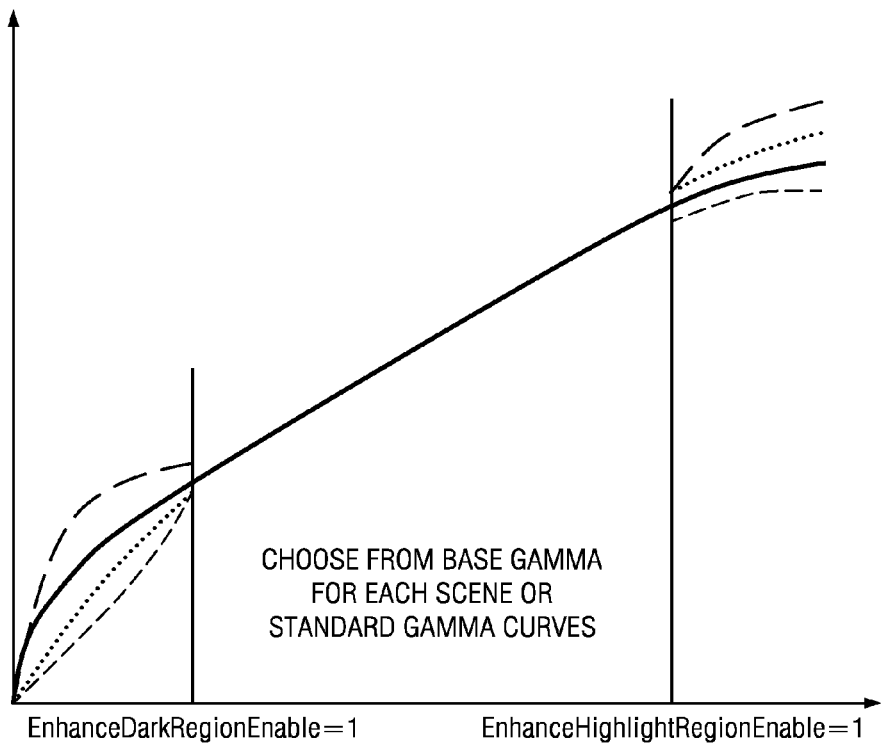
FIG. 5 is an embodiment of a gamma curves optimized for individual scenes.

The proposed method of GBCE can also choose gamma curves based on particular scene to improve brightness and contrast. The method can choose from base gamma curves for each scene or a standard gamma curve for all scenes. Moreover, the method can also enhance the shadow and highlight regions individually if either of the parameters namely EnhanceDarkRegionEnable and EnhanceHighlightRegionEnable shown in the FIG. 5, which are set to 1. FIG. 5 is an embodiment of a gamma curves optimized for individual scenes.

Figure 6:
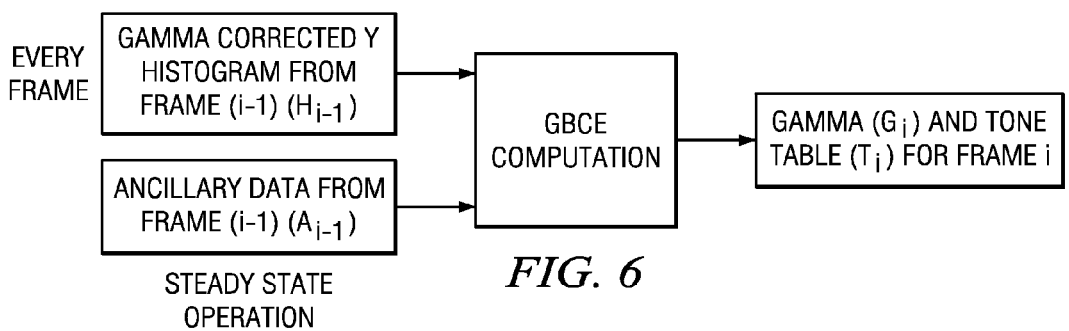
FIG. 6 is an embodiment of global brightness and contrast block diagram for each video frame.

The proposed method may be implemented on both image and video systems. The details are as shown in FIG. 6. FIG. 6 is an embodiment of global brightness and contrast block diagram for each video frame The notations are defined as follows:
(Hi−1) Histogram after Gamma for frame (i−1)
(Ai−1) Ancillary data for frame (i−1), which are Exposure Time Analog and Digital Gains
(Ri) Single Output GBCE Table (Tone+Gamma) for frame (i)
(Gi) Gamma Table for frame (i)
(Ti) Tone Table for frame (i)

The steady state operation is as shown in FIG. 6. The method is capable of generating Gamma, Tone and a combined GBCE table based on the hardware requirements.

Figure 7:
FIG. 7 is an embodiment depicting improved images as a result of the current invention.
Figure 7:
Figure 7:

FIG. 7 is an embodiment depicting improved images as a result of the current invention. As shown in FIG. 7, the proposed method may provide for improved brightness and contrast for images and video using adaptive tone mapping under various scene conditions, be capable of generating scene-adaptive Gamma curves and local enhancement to the curves, fixing auto exposure failure cases, avoid noise amplification in dark/low-light conditions, avoid color de-saturation and preserve natural colors, avoid over saturation and preserves content in the highlight regions, preserve content in the Mid tones. In high dynamic scenes, the method brightens the shadows and preserves the highlights, and since it outputs a look-up table, it requires low execution time and memory. As such, the proposed method may provide for advantages, such as, generalizing well on large dataset, scene adaptiveness provides optimal GBCE for each scene condition, and the likes.

While the foregoing is directed to embodiments of the present invention, other and further embodiments of the invention may be devised without departing from the basic scope thereof, and the scope thereof is determined by the claims that follow.

What is claimed is:

1. A method for enhancing at least one of video and image quality using an exposure aware scene adaptive global brightness contrast, comprising:
    determining if gain control is needed utilizing Gamma corrected histogram and ancillary data;
    if gain control is not required, computing a set of scene adaptive tone points and blending with information from histogram equalization if needed, if gain control is required, estimating a gain value and utilizing the gain value in computing the gain table, and
    accordingly, generating a look-up table for enhancing global brightness contrast utilizing the gain table, a tone table and the information from histogram equalization.

2. The method of claim 1, further comprising utilizing ancillary data and gamma corrected histogram to determine histogram equalization curve.

3. The method of claim 2, further comprising generating a blended table using gain table, tone table and histogram equalization table for generating the final look-up table.

4. An apparatus, comprising
    determining if gain control required utilizing Gamma corrected histogram and ancillary data;
    means for computing a set of scene adaptive tone points and means for blending with the information from histogram equalization if gain control is not needed, and means for estimating a gain value and utilizing the gain value in computing gain table utilized if gain control is needed; and
    means for generating a look-up table for enhancing global brightness contrast utilizing the gain table, a tone table and the information from histogram equalization.

5. The apparatus of claim 4, further comprising means for utilizing ancillary data and gamma corrected histogram to determine histogram equalization curve.

6. The apparatus of claim 5, further comprising means for generating a blended table using gain table, tone table and histogram equalization table for generating the final look-up table.

7. A non-transitory computer-readable storage medium with an executable program stored thereon, wherein the program instructs a microprocessor to perform a method for enhancing video/image quality using an exposure aware scene adaptive global brightness contrast, comprising:
    determining if gain control is needed utilizing Gamma corrected histogram and ancillary data;
    if gain control is not required, computing a set of scene adaptive tone points and blending with information from histogram equalization if needed, if gain control is required, estimating a gain value and utilizing the gain value in computing the gain table, and
    accordingly, generating a look-up table for enhancing global brightness contrast utilizing the gain table, a tone table and the information from histogram equalization.

8. The non-transitory computer-readable storage medium of claim 7, wherein the method further comprising utilizing ancillary data and gamma corrected histogram to determine histogram equalization curve.

9. The non-transitory computer-readable storage medium of claim 8, wherein the method further comprising generating a blended table using gain table, tone table and histogram equalization table for generating the final look-up table.

* * * * *